United States Patent
Schild et al.

(10) Patent No.: US 9,519,150 B2
(45) Date of Patent: Dec. 13, 2016

(54) METHOD FOR OPTIMIZING AN INTENSITY OF A USEFUL LIGHT DISTRIBUTION

(71) Applicant: JENOPTIK Optical Systems GmbH, Jena (DE)

(72) Inventors: Chris Schild, Jena (DE); Tobias Graf, Jena (DE)

(73) Assignee: Jenoptik Optical Systems GmbH, Jena (DE)

( * ) Notice: Subject to any disclaimer, the term of this patent is extended or adjusted under 35 U.S.C. 154(b) by 53 days.

(21) Appl. No.: 14/449,642

(22) Filed: Aug. 1, 2014

(65) Prior Publication Data
US 2015/0036216 A1 Feb. 5, 2015

(30) Foreign Application Priority Data
Aug. 1, 2013 (DE) .................. 10 2013 012 727

(51) Int. Cl.
| | |
|---|---|
| G02B 27/46 | (2006.01) |
| H01S 3/13 | (2006.01) |
| G02B 27/09 | (2006.01) |
| H01S 3/23 | (2006.01) |
| F21V 13/02 | (2006.01) |

(52) U.S. Cl.
CPC ........... *G02B 27/0927* (2013.01); *F21V 13/02* (2013.01); *H01S 3/2383* (2013.01)

(58) Field of Classification Search
CPC ... G02B 27/0927; G02B 27/46; G02B 5/0125; H01S 3/2382
USPC ........ 359/15, 558, 559; 372/101, 32, 29.023
See application file for complete search history.

(56) References Cited

U.S. PATENT DOCUMENTS

| 7,532,651 B2 * | 5/2009 | Bloom ............... G02B 27/0927 372/101 |
| 7,554,737 B2 * | 6/2009 | Knox .................... G02B 5/0215 359/15 |
| 2003/0128342 A1 | 7/2003 | Wada et al. |

FOREIGN PATENT DOCUMENTS

| DE | 10 2008 005 219 A1 | 7/2009 |
| DE | 10 2011 119 565 A1 | 11/2012 |

OTHER PUBLICATIONS

"Fresnel Propagation and Diffraction and Paraxial Wave Equation", J.Optics, vol. 13, No. 6, 1982; Raffaele Grella.
"Laser Beams and Resonators"; Proceedings of the IEEE, vol. 54, No. 10, 1966; H.Kogelnik and T. Li.

* cited by examiner

*Primary Examiner* — Audrey Y Chang
(74) *Attorney, Agent, or Firm* — Muncy, Geissler, Olds & Lowe, P.C.

(57) ABSTRACT

A method for optimizing an intensity of a useful light distribution includes: providing a light source for emitting a light beam in a z-direction, which defines an optical axis, with a first intensity distribution; providing a beam shaping optical unit and a beam focusing optical unit for generating a second intensity distribution to be used in a target plane, the target plane being inclined by an angle ALPHA relative to a focal plane determined by the beam focusing optical unit; determining a first intensity at a first point and a second intensity at a second point of the second intensity distribution to be used. The points P1 and P2 are arranged on different sides of the back focal plane; and displacing the beam shaping optical unit along the y-axis in such a way that the difference between the two intensities I1 and I2 lies within a predefinable limit.

3 Claims, 6 Drawing Sheets

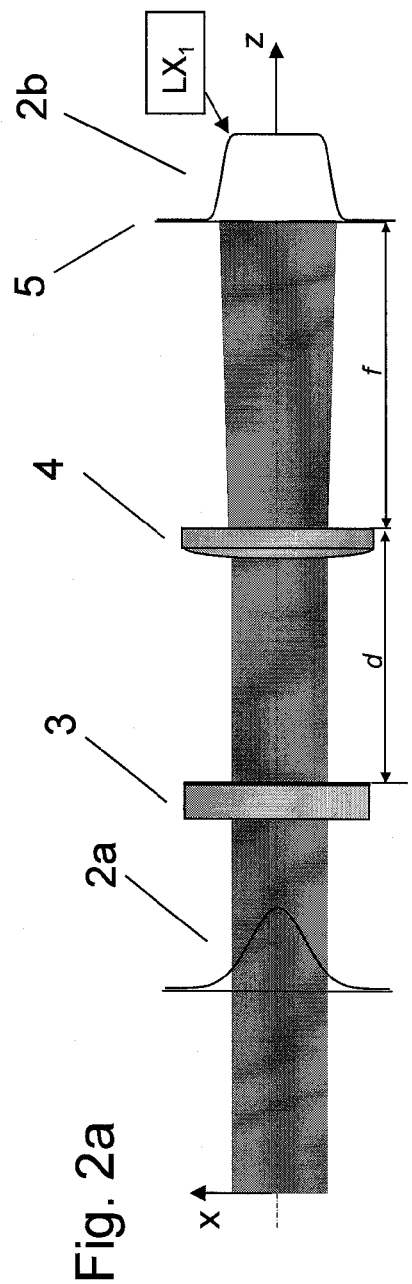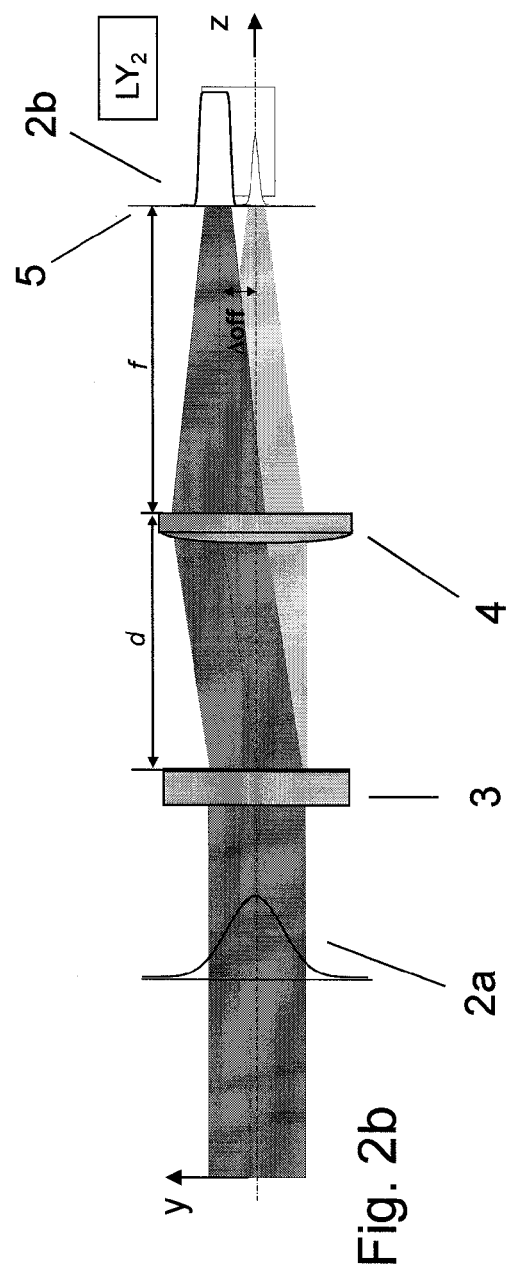

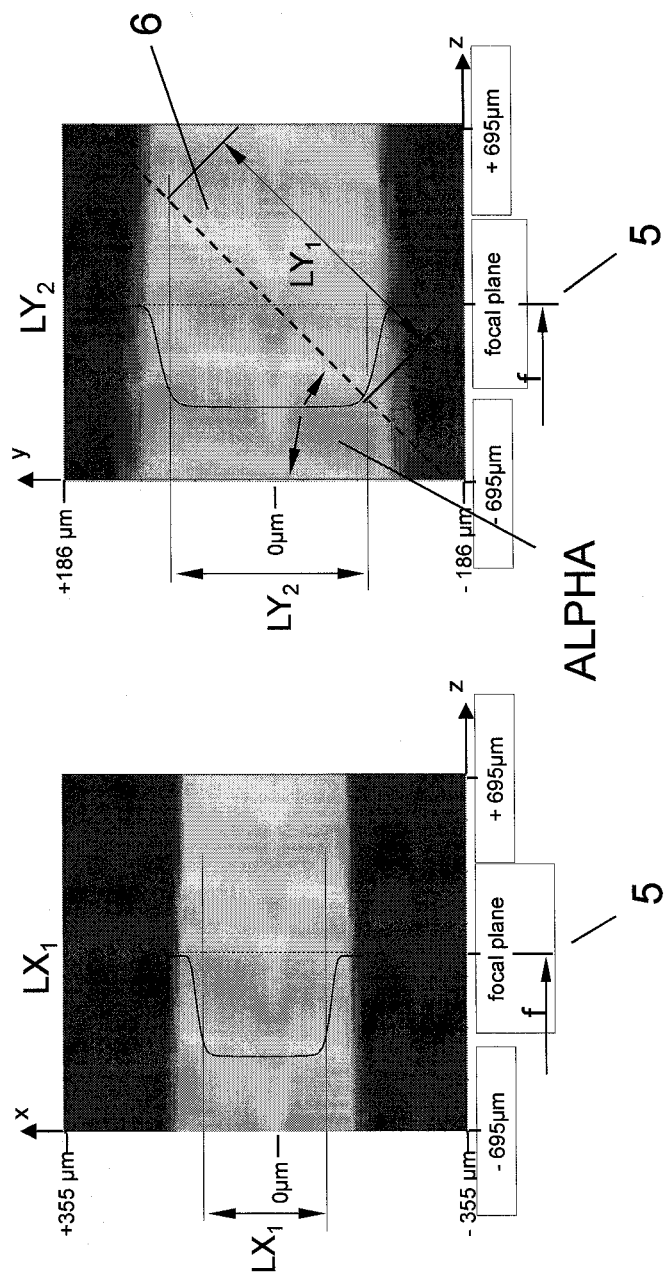

METHOD FOR OPTIMIZING AN INTENSITY OF A USEFUL LIGHT DISTRIBUTION

This nonprovisional application claims priority under 35 U.S.C. §119(a) to German Patent Application No. 10 2013 012 727.0, which was filed in Germany on Aug. 1, 2013, and which is herein incorporated by reference.

BACKGROUND OF THE INVENTION

Field of the Invention

The present invention relates to a method for optimizing an intensity of a useful light distribution.

Description of the Background Art

Traditional beam shaping with optical elements (e.g. diffractive or refractive optical elements) is often effected in a back focal plane of a so-called "1f or 2f construction." These embodiments are widely used special cases of a general optical construction for generating Fraunhofer diffraction patterns, in which construction e.g. a collimated beam illuminates a beam shaping optical element (e.g. a diffractive optical element) positioned at a distance d upstream of a focusing lens having a focal length f.

The light distribution deflected by the beam shaping optical unit (e.g. by diffraction) is transformed into the desired spatial light distribution to be used (useful light distribution) by means of the focusing lens (having the focal length f) in the back focal plane. For the case of the "2f construction", reference is generally also made to Fraunhofer diffraction or Fraunhofer observation mode. In these embodiments, the useful light distribution is made available in a plane perpendicular to the optical axis.

The diffraction pattern or the desired light distribution (useful light distribution) in the back focal plane of the lens is also designated as the far field distribution. Disregarding the thickness of the focusing lens, the distance between the beam shaping optical unit and the back focal plane corresponds exactly to the focal length f in the case d=0; exactly to twice the focal length in the case d=f. Therefore, these embodiments are commonly also designated as "1f and 2f construction". Referring more specifically to the 1f construction (d=0), there is a further special case, which constitutes a fixed combination of beam shaping element and the lens function, the so-called Fresnel element (beam shaping element and lens element are combined as one element).

DE 10 2008 005 219 A1 discloses a device for shaping a light beam which converts a Gaussian profile of the light distribution at the input into a top hat profile at the output, wherein the wavefront of the light beam in the working plane is comparatively flat as a result of profiles of refractive optical elements optimized on the basis of wave equations, as a result of which the desired top hat intensity distribution is present in a larger region around the working plane.

DE 10 2011 119 565 A1 discloses a lighting device which contains diffractive and/or refractive optical elements and converts a Gaussian profile at the input into a top hat profile at the output, wherein an optimization of the light distribution for a target plane inclined relative to the optical axis is effected by optical means.

For certain lighting situations it is necessary and desirable that the useful light distribution is not intended to be made available in a plane perpendicular to the optical axis, but rather in a plane inclined by an angle relative to said plane, wherein the intensity of the useful light distribution is still intended to remain symmetrical and uniform.

SUMMARY OF THE INVENTION

It is therefore an object of the present invention to provide a method for optimizing an intensity of a useful light distribution in an inclined plane, wherein the quality of the intensity distribution in comparison with an intensity distribution in a non-inclined plane does not become significantly worse.

In an embodiment of the invention, a method for optimizing an intensity of a useful light distribution comprises the following features: providing a light source for emitting a light beam in a z-direction, which defines an optical axis, with a first intensity distribution; providing a beam shaping optical unit and a beam focusing optical unit, which are arranged substantially perpendicularly to the z-direction in an x-y plane spanned by an x-direction and a y-direction, for generating a second intensity distribution to be used in a target plane, wherein the target plane is inclined by an angle ALPHA relative to a focal plane determined by the beam focusing optical unit; determining a first intensity I1 at a first point P1 and a second intensity I2 at a second point P2 of the second intensity distribution to be used, wherein the points P1 and P2 are arranged on different sides of the back focal plane; displacing the beam shaping optical unit along the y-axis in such a way that the difference between the two intensities I1 and I2 lies within a predefinable limit. The invention thus makes use of the insight that, by means of a targeted displacement of the beam shaping optical unit along the y-axis, the intensity distribution to be used (useful light distribution) can be optimized with regard to its symmetry and uniformity.

In an embodiment, the beam shaping optical unit is embodied as a diffractive or refractive optical unit and the beam focusing optical unit is embodied as a lens. Such optical units are particularly well suited to making available an optimized useful light distribution.

It goes without saying that the embodiments just described can be presented by themselves or in combination with one another. If a preferred embodiment comprises an "and/or" combination between a first feature and a second feature, then this should be interpreted such that the embodiment has both the first feature and the second feature and, in accordance with a further embodiment, either only the first feature or only the second feature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2a shows a schematic illustration of a device according to the invention in the direction of a y-axis;

FIG. 2b shows a schematic illustration of a device according to the invention in the direction of an x-axis;

FIG. 3a shows propagation of the intensity distribution LX1 along the z-axis;

FIG. 3b shows propagation of the intensity distribution LY2 along the z-axis;

FIG. 5b shows an enlarged illustration of a marked excerpt from FIG. 5a.

DETAILED DESCRIPTION

Figure 1:
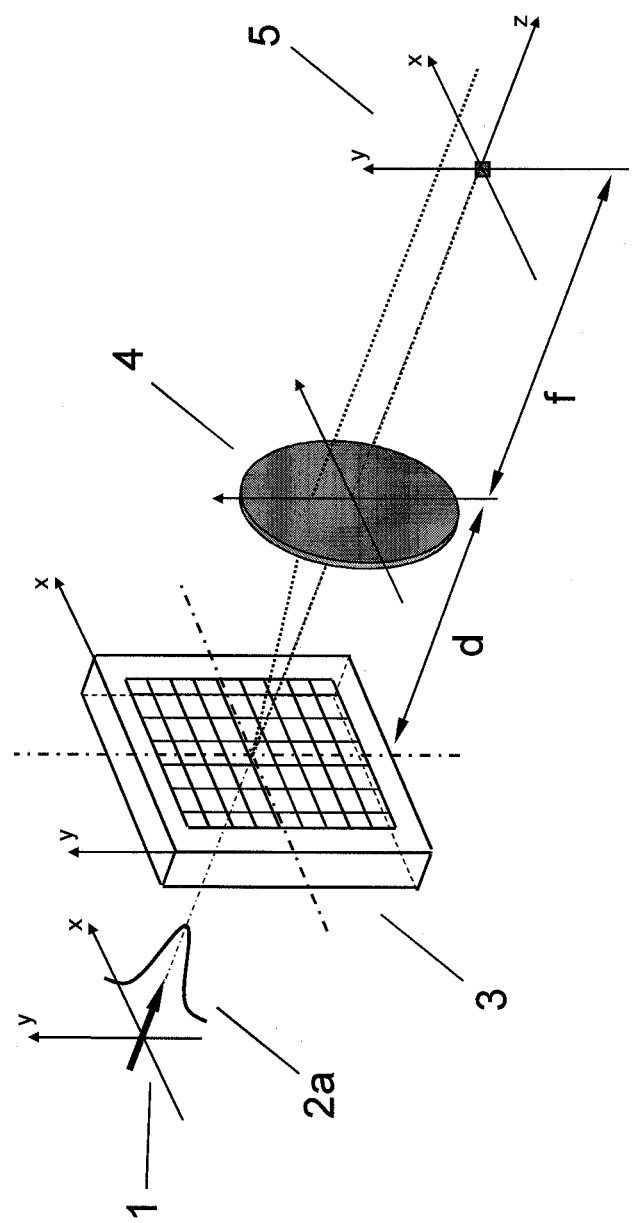
FIG. 1 shows a schematic construction of a device according to the invention for carrying out a method for optimizing an intensity of a useful light distribution.

FIG. 1 shows a schematic view of a construction of a device according to an embodiment of the invention for carrying out a method for optimizing an intensity of a useful light distribution. In this case, the coordinate system required for the invention will be defined first of all. The coordinate system has a z-axis, wherein the z-axis is oriented at least parallel to an input beam 1 entering the device and is also designated as the optical axis in the context of the invention. The input beam 1 is generated by a light source not illustrated in more specific detail, for example a laser source. Perpendicular to the z-axis or the optical axis, a plane is spanned by an x-direction and a y-direction. Firstly a beam shaping optical unit 3 is arranged in said plane and a beam focusing optical unit 4 is arranged in a plane parallel thereto, wherein the distance between these two optical units has a value d. The beam shaping optical unit 3 is embodied as a diffractive optical unit, for example, and is arranged in a manner displaceable by a mechanism along the y-direction. The beam focusing optical unit 4 is embodied for example as a lens having a focal length f. Consequently, the input beam 1, which has a first intensity distribution 2a, a Gaussian distribution in this exemplary embodiment, is generated as a second intensity distribution 2b to be used in a back focal plane 5 by means of the beam shaping and beam focusing optical units. In accordance with this exemplary embodiment, the second intensity distribution is a rectangular distribution, also known as a top hat distribution.

FIGS. 2a and 2b show a device according to the invention once again in a sectional view perpendicular to the y-axis (FIG. 2a) and perpendicular to the x-axis (FIG. 2b), wherein in this exemplary embodiment the rectangular useful light distribution (top hat distribution) 2b is provided perpendicularly to the optical axis. Furthermore, a so-called off-axis design approach was chosen in this exemplary embodiment. This means that the zeroth order of diffraction is arranged in a manner offset by an absolute value Δoff with respect to the useful light distribution 2b (see FIG. 2b).

The starting point for the method according to the invention is firstly the calculation of the rectangular distribution $LX_1$ and $LY_2$ in the x-y plane perpendicular to the optical axis (z-axis) (see FIG. 3a and FIG. 3b).

Figure 4:
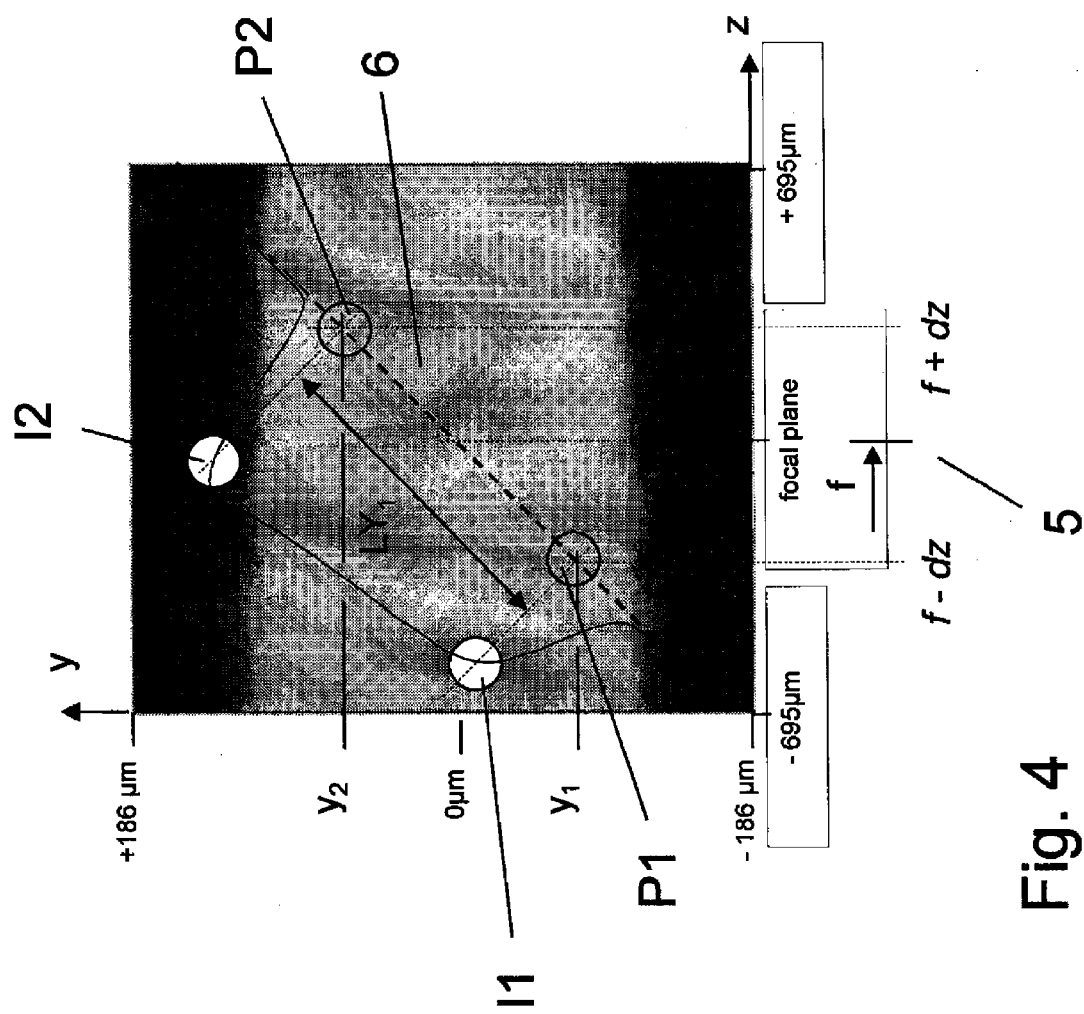
FIG. 4 shows the intensity distribution of the useful light on the inclined target plane.

Furthermore, $LX_1$ and $LY_1$ (see FIG. 3a, FIG. 3b and FIG. 4) shall be the intensity distributions or lateral extents of the desired distribution in the plane 6 inclined by an angle ALPHA. In this exemplary embodiment, an intensity distribution is desired in a plane situated about the x-axis and in a manner inclined by the angle ALPHA (e.g.) 75°. In the case of the illumination of an inclined or oblique plane using a beam shaping optical unit, in particular a diffractive optical unit, for generating a top hat distribution in the back focal plane 5, a stretched top hat distribution arises in the illumination plane 6, depending on the inclination angle ALPHA.

The projection or the stretching of $LY_2$ into the illumination plane 6 results in a widening of $LY_2 \rightarrow LY_1$. The projection from the oblique plane into the x-z axis results in: $LY_2 = LY_1 \times \sin(90° - ALPHA)$.

Furthermore, it is assumed according to the invention that the top hat distribution extends over the interval (f−dz, f+dz) along the optical axis, and that the illumination plane is characterized by rotation by an angle ALPHA about the x-axis (see FIG. 3b).

FIG. 3a and FIG. 3b illustrate the spatial intensity and the propagation of the rectangular intensity distributions in both axes x and y along the z-axis by f±695 μm near the focal point or the back focal plane 5. The intensity extent $LY_1$ of the desired top hat distribution in the oblique plane is additionally indicated. The uniformity of the intensity distribution in the illumination plane is generally impaired by an intensity decrease along the z-axis.

One possibility for optimization is, then, in taking into consideration the intensity level at intersection points of y with the transverse planes {z=f−dz} and {z=f+dz}. These points are respectively designated by P1=(0, $y_1$, f−dz) and P2=(0, $y_2$, f+dz) and the corresponding intensities are designated by I1 and I2. By means of a suitable lateral offset or displacement of the beam shaping optical unit along the y-axis, it is possible to reduce this intensity difference and to optimize the uniformity of the intensity distribution in the inclined plane.

A displacement Δy of the beam shaping optical unit in the negative y-direction generally leads to an increase of I1 and a decrease of I2, and a displacement by Δy in the positive y-direction leads to an increase of I2 and a decrease of I1. By iteratively adapting the lateral offset of the beam shaping optical unit, it is possible to optimize the uniformity error $|I_1 - I_2|$, such that it lies within a predefinable limit t. The physically achievable tolerances for a termination criterion, i.e. t>0, such that the optimization is terminated if $|I_1 - I_2| < t$, are dependent, inter alia, on the physical-optical depth of field, the numerical aperture, the inclination angle of the optical construction and the desired magnitude of the top hat distribution in the x-axis and y-axis.

One possible procedure according to the invention for determining the intensities I1 and I2 relevant to the optimization process is described in greater detail below.

In order to simplify the illustration and the calculation of the intensities, a "1f construction" and scalar electric fields are taken into account there. Moreover, the paraxial approximation and the thin element approximation are used.

Assuming a thin lens 3 (having the focal length f) and a Gaussian incident beam, the transverse scalar electric field directly downstream of the lens (z=0) is given by the function $$u_0(x, y) \exp\left(\frac{ik(x^2 + y^2)}{q}\right) \exp(ip(x, y)) \exp\left(-ik \frac{x^2 + y^2}{2f}\right) \quad (1)$$

wherein the first term corresponds to a Gaussian input beam, the function p(x,y) models the phase transmission of the beam shaping optical unit and the third term describes the induced phase curvature of an ideal lens. In the representation of the Gaussian input beam, q denotes the so-called complex beam parameter; the latter is purely imaginary in the beam waist. Furthermore, the focal length of the lens 3 is designated by f. Such model descriptions are generally known and explained for example in the two publications Grella, Fresnel Propagation and Diffraction and Paraxial Wave Equation, J. Optics, Vol. 13, No 6, 1982 and Kogelnik, Li, Laser Beams and Resonators, Proceedings of the IEEE, Vol. 54, No. 10, 1966, the entire disclosure content of which is intended to be part of this application.

Free space propagation in the paraxial approximation is described, as follows, by the paraxial wave equation $$\frac{\partial u(x, y, z)}{\partial z} = \frac{i}{2k}\left(\frac{\partial^2}{\partial x^2} + \frac{\partial^2}{\partial y^2}\right)u(x, y, z) \qquad (2)$$

Thus, the following representation arises for the scalar electric field after propagation over the distance z:

$$u(x, y, z) IFT\left[FT[u_0(x, y)] \cdot \exp\left(-i\left(\frac{k_x^2 + k_y^2}{2k}\right)z\right)\right] \qquad (3)$$

wherein FT and IFT denote the Fourier transformation and inverse Fourier transformation, respectively, with regard to the spatial variables x, y and spatial frequencies $k_x$, $k_y$. This method can be extended to other optical constructions besides the 1f construction. In order to avoid the paraxial approximation, the Helmholtz equation is used, if appropriate, instead of the paraxial wave equation.

With the relationship for determining the intensity:

$$I(x,y,z) \propto |u(x,y,z)|^2 \qquad (4)$$

and the coordinate points $P1=(0, y_1, f-dz)$ and $P2=(0, y_2, f+dz)$, the relative intensity difference |I1−I2| can be calculated and introduced into the optimization process.

Figure 5A:
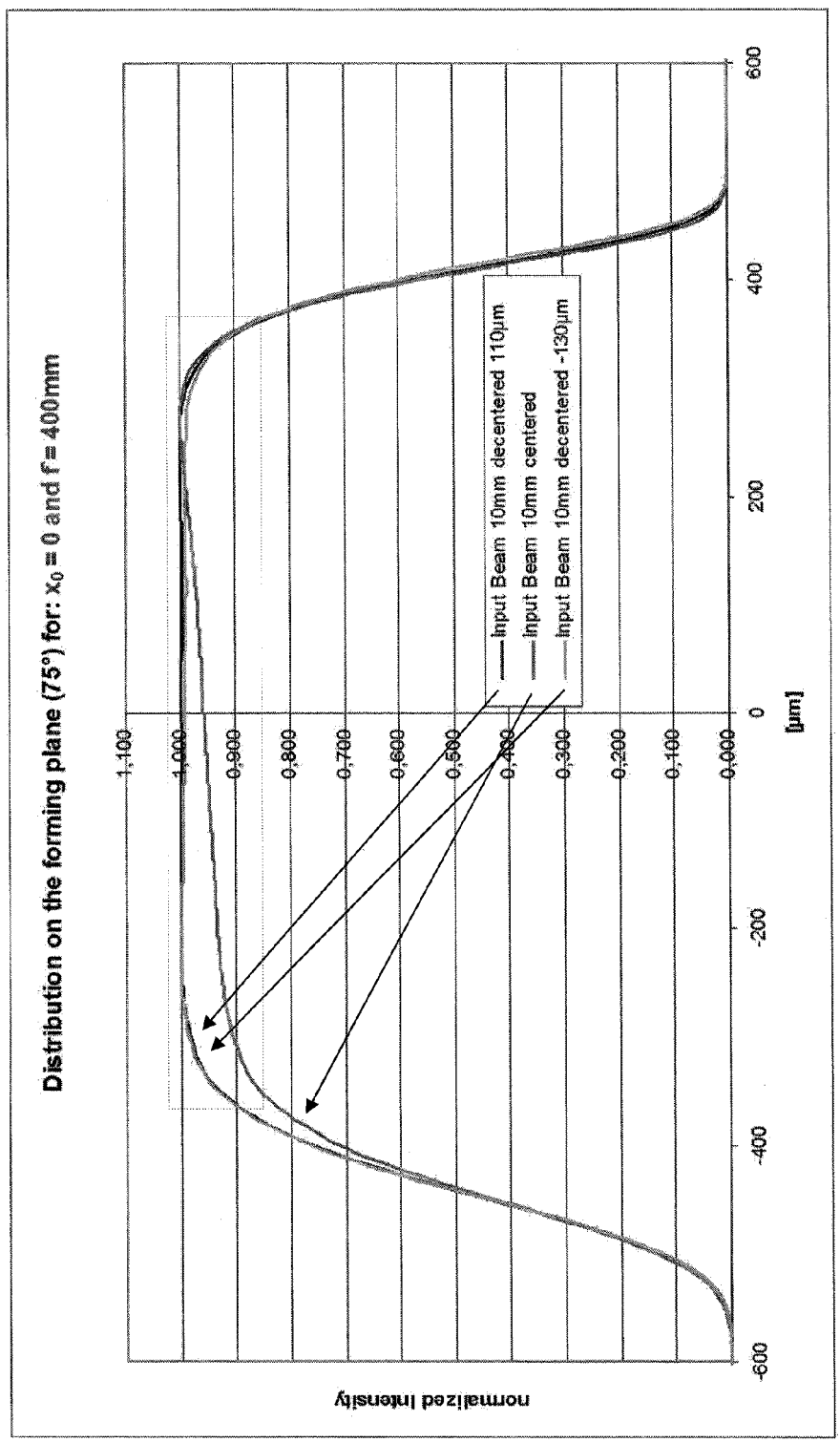
FIG. 5a shows various intensity illustrations of the useful light before and after displacement of the beam shaping optical unit.
Figure 5B:
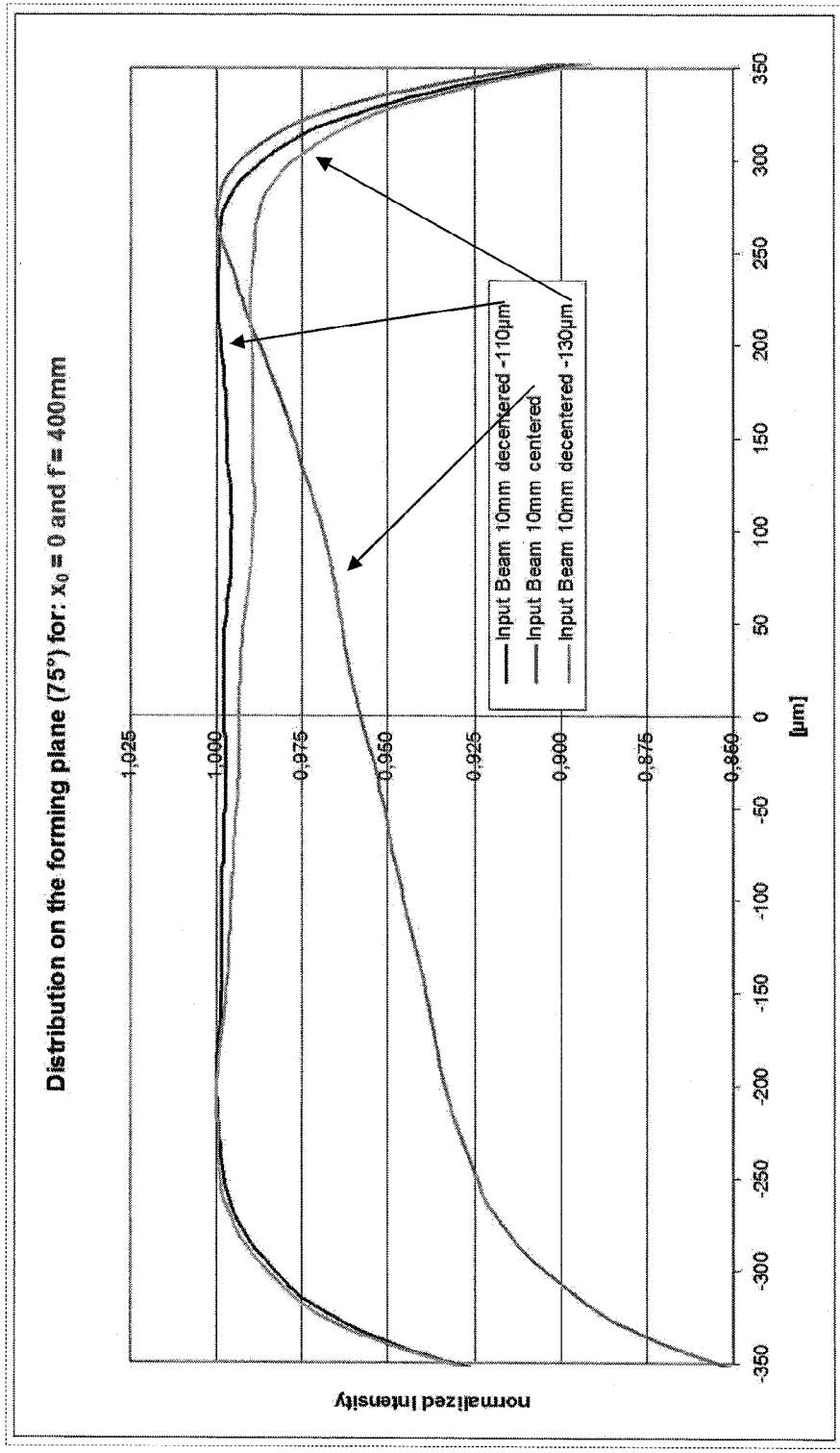

FIG. 5a and FIG. 5b illustrate a result of the method according to the invention, wherein FIG. 5b shows an identified enlarged excerpt from FIG. 5a. It can be discerned that an improved top hat distribution can be achieved by displacement of the beam shaping element by 110 or 130 µm.

Consequently, as considered overall, the method according to the invention makes it possible to provide an optimized useful light distribution in an inclined plane in a relatively simple manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for optimizing an intensity of a useful light distribution comprising:
providing a light source for emitting a light beam in a z-direction, which defines an optical axis, with a first intensity distribution;
providing a beam shaping optical unit and a beam focusing optical unit, which are arranged substantially perpendicularly to the z-direction in an x-y plane spanned by an x-direction and a y-direction, for generating a second intensity distribution to be used in a target plane, the target plane being inclined by an angle ALPHA relative to a back focal plane determined by the beam focusing optical unit;
determining a first intensity of the second intensity distribution at a first point of the second intensity distribution and a second intensity of the second intensity distribution at a second point of the second intensity distribution to be used, the first point and the second point being arranged on different sides of the back focal plane; and
displacing the beam shaping optical unit along a y-axis such that a difference between the first and second intensity lies within a predefinable limit.

2. The method as claimed in claim 1, wherein the beam shaping optical unit is a diffractive or refractive optical unit.

3. The method as claimed in claim 1, wherein the first intensity distribution is a Gaussian distribution and the second intensity distribution is a top hat distribution.

* * * * *